(12) United States Patent
Liu et al.

(10) Patent No.: US 7,604,779 B2
(45) Date of Patent: *Oct. 20, 2009

(54) ENVIRONMENTAL CONTROL SYSTEM INCLUDING OZONE-DESTROYING CATALYTIC CONVERTER HAVING ANODIZED AND WASHCOAT LAYERS

(75) Inventors: Di-Jia Liu, Naperville, IL (US); Daniel R. Winstead, Schaumburg, IL (US); Peter M. Michalakos, Chicago, IL (US)

(73) Assignee: Honeywell International Inc., Morristown, NJ (US)

( * ) Notice: Subject to any disclaimer, the term of this patent is extended or adjusted under 35 U.S.C. 154(b) by 625 days.

This patent is subject to a terminal disclaimer.

(21) Appl. No.: 11/228,949

(22) Filed: Sep. 16, 2005

(65) Prior Publication Data

US 2006/0062704 A1    Mar. 23, 2006

Related U.S. Application Data

(60) Continuation of application No. 10/431,477, filed on May 7, 2003, now Pat. No. 7,037,878, which is a division of application No. 09/379,036, filed on Aug. 23, 1999, now Pat. No. 6,576,199.

(60) Provisional application No. 60/101,140, filed on Sep. 18, 1998.

(51) Int. Cl.
  *B01D 50/00* (2006.01)
  *B01J 23/40* (2006.01)

(52) U.S. Cl. .................. 422/177; 422/180; 502/326

(58) Field of Classification Search .................. 422/177, 422/180; 502/217.12, 439, 527.12, 326, 502/327
See application file for complete search history.

(56) References Cited

U.S. PATENT DOCUMENTS

| | | | |
|---|---|---|---|
| 3,441,381 A | 4/1969 | Keith et al. | |
| 4,359,039 A | 11/1982 | Uchikawa | |
| 4,405,507 A | 9/1983 | Carr et al. | |
| 4,560,620 A | 12/1985 | Arai | |
| 4,607,722 A | 8/1986 | Tanaka et al. | |
| 5,422,311 A | 6/1995 | Woo | |
| 5,620,672 A | 4/1997 | Galligan et al. | |
| 6,203,771 B1 | 3/2001 | Lester et al. | |
| 6,340,066 B1 * | 1/2002 | Dettling et al. | 180/54.1 |
| 6,576,199 B1 * | 6/2003 | Liu et al. | 422/177 |

FOREIGN PATENT DOCUMENTS

| | | |
|---|---|---|
| EP | 0 388 094 A1 | 9/1990 |
| EP | 0 853 142 A1 | 7/1998 |
| WO | WO 94/09903 | 5/1994 |
| WO | WO 95/32053 | 11/1995 |

* cited by examiner

*Primary Examiner*—Tom Duong
(74) *Attorney, Agent, or Firm*—Oral Caglar, Esq.

(57) ABSTRACT

An aircraft environmental control system includes a catalytic converter having ozone-destroying capability. A surface of the catalytic converter is anodized to form an anodized layer, and the metal oxide layer is washcoated to form a washcoat layer. An ozone destroying catalyst is impregnated in the anodized and washcoat layers. The catalyst may include one or more metals. For example, a bimetallic catalyst may include a precious metal and a transition metal.

19 Claims, 2 Drawing Sheets

ENVIRONMENTAL CONTROL SYSTEM INCLUDING OZONE-DESTROYING CATALYTIC CONVERTER HAVING ANODIZED AND WASHCOAT LAYERS

CROSS REFERENCE TO RELATED APPLICATION

This is a continuation of U.S. application Ser. No. 10/431,477 filed May 7, 2003, which issued as U.S. Pat. No. 7,037,878, which is a divisional patent application of U.S. application Ser. No. 09/379,036 filed Aug. 23, 1999 and issued as U.S. Pat. No. 6,576,199 on Jun. 10, 2003, which claims benefit of U.S. Provisional Application Ser. No. 60/101,140 filed Sep. 18, 1998, the disclosure of each of which is incorporated by reference herein.

BACKGROUND OF THE INVENTION

The present invention relates to environmental control systems. More specifically, the present invention relates to an environmental control system including an ozone-destroying catalytic converter.

A commercial aircraft usually includes an environmental control system for providing a stream of cooled, conditioned air to an aircraft cabin. A typical environmental control system receives compressed air such as bleed air from a compressor stage of an aircraft gas turbine engine, expands the compressed air in a cooling turbine and removes moisture from the compressed air via a water extractor.

Toxic ozone in the compressed air becomes an issue when an aircraft is cruising at altitudes that exceed 20,000 feet. To reduce the ozone to a level within satisfactory limits, the environmental system is provided with an ozone-destroying catalytic converter.

There are a number of desirable characteristics for an ozone-destroying catalytic converter of an aircraft. These characteristics include a) high efficiency of ozone conversion at bleed air operating temperature; b) good poison resistance from humidity, sulfur compounds, oil, dust, and the like, which may be present in the compressed air (for long life and minimum system overhaul and maintenance costs); c) light weight to minimize system parasitic load; d) high structural integrity of catalyst support under extreme heat and/or vibration shock, which may arise during normal flight conditions (also for long life and minimum system overhaul and maintenance costs); and e) high mass transport efficiency with low pressure drop.

An ozone-destroying catalytic converter with a metal core may be washcoated with a slurry of a water-based silica sol and a refractory metal to form an undercoat layer followed by an overcoat layer of alumina oxide. Both layers may then be catalyzed directly by dipping the washcoated core in a catalyst solution having strong acidity. However, the strongly acidity can cause corrosion of the metal core, especially if the core is made of aluminum.

The overcoat layer may be pre-catalyzed and then washcoated onto the core. Using a pre-catalyzed layer can prevent corrosion during the catalyzing process.

Applying the pre-catalyzed overcoat layer can be problematic. For example, it is difficult to control the uniformity of washcoat layer thickness. Unevenness of the layer thickness can cause a pressure drop across the catalytic converter.

Another problem with the pre-catalyzed overcoat layer is poor catalyst utilization efficiency. Washcoating the pre-catalyzed metal oxide can render certain fractions of the catalytic site inaccessible due to the shielding of the binder material. Furthermore, the surface area provided by the undercoat is not utilized to extend the catalyst lifetime. Since poisons in the compressed air can reduce the efficiency of conversion, lifetime and efficiency of the catalytic converter is further reduced because of the poor catalyst utilization efficiency.

Another potential problem with water-based washcoat layers is its limited mechanical durability. A catalytic converter for a commercial aircraft is subjected to high temperatures and large temperature swings (e.g., between 150° F. and 500° F.) during normal flight operation. The catalytic converter is also subjected to high vibrations during normal flight operation. These harsh conditions can cause the washcoat layer to flake off. Consequently, operating life of the catalytic converter is reduced.

SUMMARY OF THE INVENTION

According to one aspect of the present invention, an ozone-destroying catalytic converter comprises a core; an anodized surface layer formed from a portion of the core; a washcoat layer on the anodized layer; and an ozone-destroying catalyst impregnated in the washcoat layer. The combination of the anodized and washcoat layers offers many advantages. The anodized layer provides a support for the catalyst and a corrosion barrier that prevents a catalyzing reagent from attacking the core during catalyst impregnation. Therefore, the catalyst can be impregnated after formation of the washcoat layer to provide maximum catalyst utilization and lifetime. The anodized layer significantly improves the binding strength between the core and the washcoat layer, which allows the washcoat layer to withstand high temperatures, large temperature swings and high vibrations such as those occurring during normal aircraft flight conditions. The anodized layer also provides additional surface area and, therefore, increases the efficiency of ozone conversion and mass transport.

According to another aspect of the present invention, the washcoat layer may be formed by creating a slurry including a refractory metal oxide and an organosiloxane resin in monomeric or polymeric form. The refractory metal oxide may be partially hydrated. The core is dipped in the slurry and the resulting washcoat is dried. Such a slurry dries faster than slurries that include water-based binders. The faster drying allows the washcoat layer to be applied more uniformly than a washcoat layer formed from a slurry that includes a water-based binder. Thus, thickness and roughness of the surface can be controlled better.

The dried washcoat is then cured and calcined. If the washcoat layer is applied to an anodized layer of the core, cross-linking of the chemical bonds between metal oxide particles, anodized surface and organosiloxane resin occurs during the curing and calcination. This cross-linking results in a washcoat layer having significant mechanical and thermal strength. Consequently, the washcoat layer is free from flaking.

DETAILED DESCRIPTION OF THE INVENTION

Figure 1:
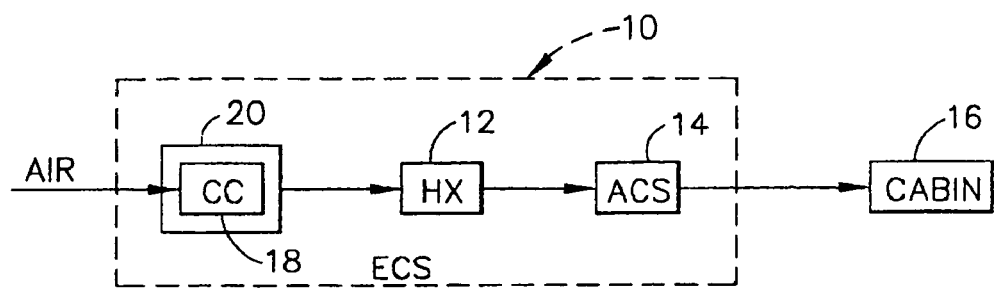
FIG. 1 is an illustration of an environmental control system including an ozone-destroying catalytic converter according to the present invention.

Reference is made to FIG. 1, which shows an aircraft environmental control system ("ECS") 10 for an aircraft. The ECS 10 receives compressed air such as bleed air from a compressor section of the aircraft's main engine. The ECS 10 includes at least one air-to-air heat exchanger ("HX") 12 for cooling the compressed air to near-ambient temperature; and an air conditioning system ("ACS") 14 for conditioning the air that was cooled in the air-to-air heat exchanger 12. The air conditioning system 14 may include an air cycle machine and a water extractor for expanding the air and reducing moisture in the air. The ECS 10 supplies cooled, conditioned air to a cabin 16 or other compartment of the aircraft.

The ECS 10 also includes a catalytic converter 18, which may be located in the belly of the aircraft, between the source of the compressed air and the air-to-air heat exchanger 12. The catalytic converter 18 is mounted inside a shell 20 through which the compressed air flows. The compressed air passes through the catalytic converter 18, which destroys ozone in the compressed air.

A precooler, not shown, may be located upstream the catalytic converter 18. The pre-cooler lowers the temperature of the compressed air prior to ozone destruction.

Figure 2:
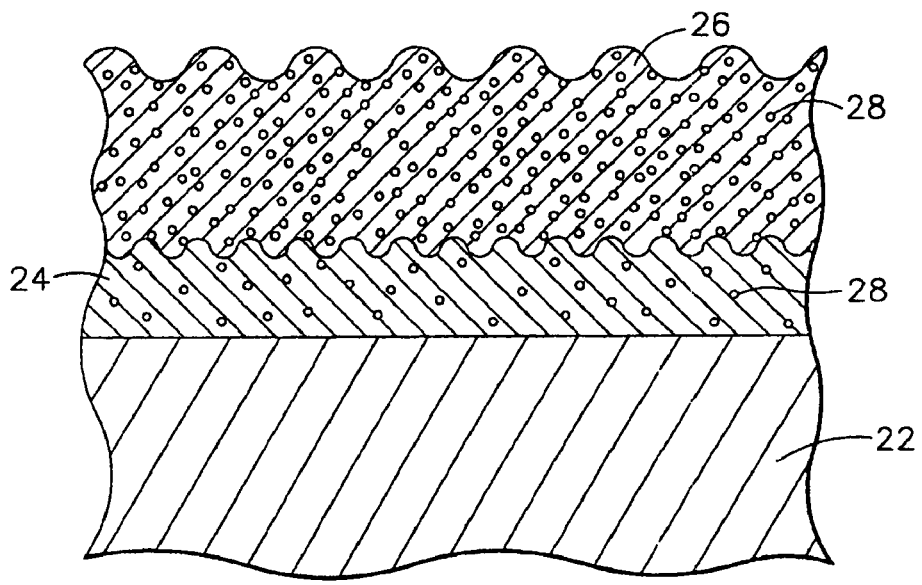
FIG. 2 is an illustration of a cross-section of a surface of a core of the ozone-destroying catalytic converter, an anodized surface layer formed from the core, a washcoat layer on the anodized layer, and an ozone-destroying catalyst impregnated in the anodized and washcoat layers.

FIG. 2 illustrates a cross-section of a surface of a portion of the catalytic converter 18. The catalytic converter includes a core 22, an anodized surface layer 24 formed from a portion of the core 22, a washcoat layer 26 formed on the anodized layer 24, and an ozone-destroying catalyst 28 impregnated in both the washcoat layer 26 and the anodized layer 24 (the layers 24 and 26 and the catalyst 28 are not shown to scale).

The anodized layer 24 has a thickness between about five to ten microns. The anodized layer 24 is dense at the interface with the core 22. However, the anodized layer 24 has a rough surface at the interface with the washcoat layer 26. For a core 22 including aluminum fins about 7 mils thick, the anodized layer 24 may have a preferred surface area ranging from 5 to 15 $m^2$/gram, including the weight of the fins. Since the anodized layer 24 is integral with the core 22, it is difficult to accurately determine the surface area of the anodized layer 24 excluding the core 22.

The washcoat layer 26 is highly porous, having a preferred pore volume ranging from 0.2 to 0.9 $cm^3$/gram, and an average pore size ranging from 3 to 25 nm. The washcoat layer 26 has a large surface area. For an aluminum core 22 having 7 mil thick fins that are anodized and washcoated, the washcoat layer 26 has a preferred surface area ranging from 50 to 70 $m^2$/gram including the weight of the fins, and a surface area ranging from 200 to 350 $m^2$/gram excluding the weight of the fins. The washcoat layer has adjustable thickness between about five to sixty microns.

The catalyst 28 is impregnated into both the washcoat layer 26 and the anodized layer 24. Concentration of the catalyst 28 in the washcoat layer 26 may be higher than concentration of the catalyst 28 in the anodized layer 24. For example, the catalyst concentration in the washcoat layer 26 may be two to four times the catalyst concentration in the anodized layer 24.

The catalyst 28 may be monometallic, or it may be bimetallic in the form of oxide with different valence states or in zero valance metallic state. For a monometallic catalyst, a precious metal such as palladium (Pd) may be used. For a bimetallic catalyst, one of the metals may be a precious metal such as palladium and the other one of the metals may be a transition metal such as nickel (Ni). In place of Pd, a metal from the precious metal group including platinum (Pt), rhodium (Rh), gold (Au), iridium (Ir) or silver (Ag) may be chosen. Likewise, in place of Ni, a metal from the transition metal group including manganese (Mn), cobalt (Co), iron (Fe), or copper (Cu) may be used.

The core 22 provides a support for the layers 24 and 26. When a stream of air containing ozone is directed across the catalytic converter 18, the air interacts with the catalyst 28, resulting in the catalytic decomposition of a majority of the ozone through the reaction, $2O_3 \rightarrow 3O_2$. An air stream, filtered of ozone, flows past the converter 18 to the heat exchanger 12.

The anodized layer 24 provides several functions. It provides a support for the catalyst. The anodized layer provides additional surface area for better distribution of the catalyst, which improves overall ozone destruction activity.

The anodized layer 24 also provides a corrosion barrier, which prevents a catalyzing reagent from attacking the core 22 and causing the metal core to corrode during catalyst impregnation. During fabrication of the catalytic converter 18, the anodized layer 24 allows the washcoat layer 26 to be fully formed on the anodized layer 24 and then the catalyst 28 to be impregnated, for example, by dipping the washcoated core 22 into a bath containing the catalyzing reagent.

The anodized layer 24 is formed through electrochemical transformation of the surface of the core 22. Because the anodized layer 24 is an integral part of the core 22, the anodized layer 24 significantly improves the binding strength between the core 22 and the washcoat layer 26. The binding strength is further enhanced through chemical cross-linking between the metal oxide of the anodized surface and a resin (i.e., an organosiloxane resin) and metal oxide in the washcoat during washcoat formation. Therefore, the washcoat layer 26 has strong adhesion to the anodized layer 24 and is semi-flexible when the core 22 deforms. As a result, the anodized layer 24 lessens the likelihood that the washcoat layer 26 will flake off when the catalytic converter 18 is subjected to high temperatures, large temperature swings and high vibrations during normal flight conditions.

The washcoat layer 26 also provides a high surface area support for the catalyst. Additionally, the washcoat layer 26 can be applied to a variety of materials. Therefore, the washcoat layer 26 allows the core 22 to be made of a lightweight metal such as aluminum or aluminum alloy.

In the alternative, the core may be formed of titanium, stainless steel, inconel, nickel alloy, cordierite, silicon nitride, alpha aluminum oxide, or other ceramic or composite materials. If the core 22 is formed of titanium or stainless steel, a thin oxide layer should be formed on the core surface prior to washcoating.

The slurry for the washcoat layer 26, which includes a refractory metal oxide and an organosiloxane resin, can be applied more uniformly than a conventional washcoat layer including a water-based binder. Applying the washcoat layer 26 uniformly reduces local buildups of the washcoat layer 26 on air flow paths within the catalytic converter 18. The local buildups can cause pressure drops within the catalytic converter 18 and redistribution of catalyst.

Because the washcoat layer 26 reduces the pressure drop inside the catalytic converter 18, the catalytic converter 18 can be designed to have a lower pressure drop than a conventional converter of similar size and configuration. Alternatively, the catalytic converter 18 may be designed to be longer yet provide the same pressure drop as a conventional converter. For example, the length of a core 22 having a straight channel air flow path can be increased. Increasing the air flow path increases the exposure of the air to the catalyst and hence increases the amount of ozone that is destroyed. Consequently, the length of the catalytic converter 18 having a straight air flow path may be longer than a conventional converter having a straight air flow path and the same pressure drop.

Alternatively, a uniform washcoat layer 26 may allow a design of a catalytic converter 18 with a core 22 having a tortuous air flow path. The tortuous path increases turbulence of the compressed air, which increases mass transfer between the compressed air and the catalyst 28 and hence increases ozone conversion efficiency. Consequently, the length of the catalytic converter 18 having the tortuous air flow path may be shorter than a conventional converter having a straight air flow path and the same or lower pressure drop.

Additionally, the better control of the coating uniformity and higher mass transfer property allows the catalytic converter 18 to have a wider diameter and a shorter length. Thus, the catalytic converter 18 may have the shape of a short disk as opposed to a conventional elongated tube. The shorter, wider construction imposes a minimum pressure drop to the air flow into the ECS 10 when the air flow rate is high and increases mass transfer rates that are beneficial for ozone destruction.

Figure 3:
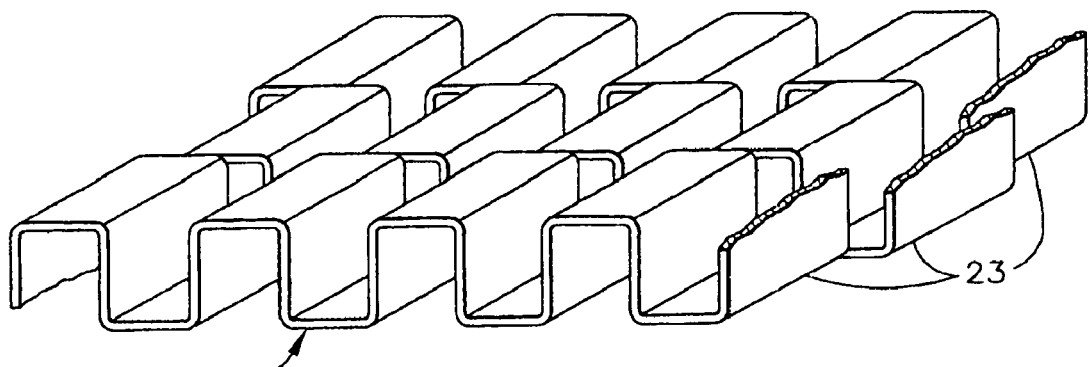
FIG. 3 is a perspective view of a portion of a plate-fin element for an ozone-destroying catalytic converter.

FIG. 3 shows a portion of an ozone-destroying catalytic converter 18 that provides a tortuous air flow path. The catalytic converter 18 includes a monolithic core 22 having a plurality of plate-fin elements 23. The plate-fin elements 23 define a multitude of small direction-changing tortuous flow paths. The plate-fin elements 23 may be arranged in a tightly packed cylindrical configuration, as a plurality of generally concentrically disposed rings. The plate-fin elements 23 may be arranged in an axial succession of adjacent rows, with a corrugated configuration of generally rectangular profile. The outer surface of the plate-fin elements 23 carries the catalyst-impregnated washcoat and anodized layers 24 and 26.

Such a catalytic converter 18 may be constructed as follows. Offset fins are stamped into a plurality of aluminum sheets. A first sheet is rolled around a tube to form an inner layer of the core. Additional layers are added by rolling additional sheets, layer-by-layer, around the core 22. After the last layer has been added to the core, an uncorrugated aluminum cover is wrapped around the outer layer. Then the core 22 is anodized, washcoated, impregnated with the catalyst and placed in the shell 20. The inner tube is blocked off to prevent the flow-through of compressed air. Thus, compressed air will flow longitudinally through the catalytic converter 18, between the inner tube and the outer cover and through the tortuous path created by the offset fins 23.

Figure 4:
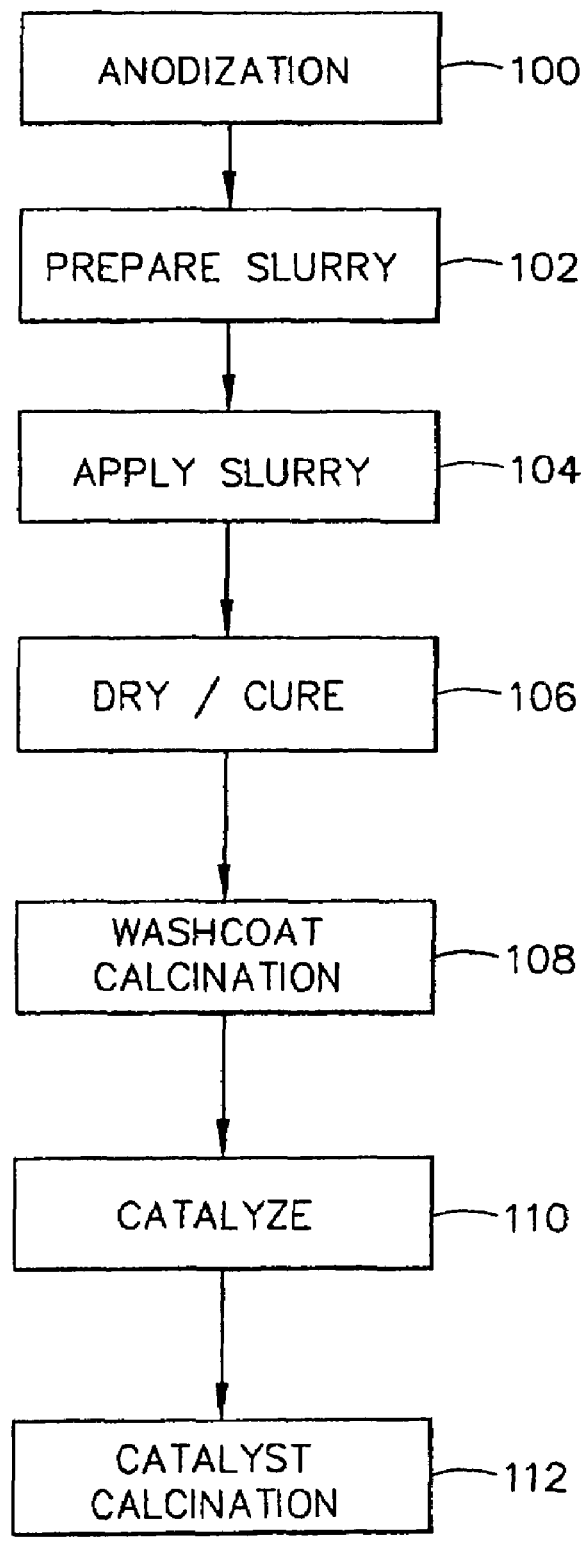
FIG. 4 is an illustration of a method of preparing a core of the catalytic converter.

FIG. 4 shows a method of forming the catalyst-impregnated anodized and washcoat layers 24 and 26 for the catalytic converter 18. First, the core 22 is electro-anodized in an oxalic acid solution to form the anodized layer 24, as indicated at step 100. In place of an oxalic acid solution, acids such as sulfuric acid, phosphoric acid, chromic acid or malonic acid may be used. Because the anodized layer 24 is formed by electro-oxidation of the metal of the core 22, the anodized layer 24 is intrinsically bound with the core 22. Because the anodized layer 24 is in the form of a metal oxide, it also provides additional surface area for distributing the catalyst metals. Because the anodized layer 24 has a different morphology than that of washcoated refractory metal oxides such as gamma aluminum oxide, it provides different distribution of the catalyst 28. The catalyst 28 distributed over the anodized layer 24 are partially shielded by the forthcoming washcoat layer 26 from the gas phase contaminants (e.g., catalyst poisons) which deactivate the catalyst 28. This feature helps to increase the operating life of the catalytic converter 18.

To create a rough texture on the surface of the anodized layer 24, the anodization is performed at a temperature above ambient. For example, the anodization can be performed at a temperature of about 40° C.

Next, the anodized core 22 is washcoated as indicated at steps 102 to 108. A slurry is prepared, as indicated in step 102. The slurry is made preferably from a jarmilled mixture of a refractory metal oxide and a synthetic silicone resin. A refractory metal oxide such as alumina, silica, aluminum silicate, magnesia, manganese oxide, titania, zirconia or ceria may be used. A partially hydrated refractory metal oxide such as boehmite may be used instead. The synthetic silicone resin may be a methylphenylsiloxane, a methylsiloxane or other organosiloxane resin in monomeric or polymeric form. The resin may be in a concentrated form or it may already be diluted with an organic solvent. The slurry may be diluted (or further diluted) by adding an organic solvent such as an alcohol (e.g., methanol, ethanol, isopropyl) or an aromatic solvent(e.g., xylene, toluene). Slurry viscosity may be adjusted by adding additional solvent. The preferred slurry mixture contains boehmite, methylphenylpolysiloxane and toluene.

In the preferred slurry, the boehmite content in the slurry ranges from 1 to 30 wt % and the methylphenylpolysiloxane content ranges from 1 to 30 wt %. The remainder of the slurry is balanced by the solvent. To facilitate the cross-linking process, a small amount (e.g., <1 wt %) of a zinc compound such as zinc octoate may be added to the slurry. The viscosity of the slurry may range from 5 to 250 centipoise. The preferred viscosity of the slurry may range from 20 to 60 centipoise.

The slurry is then applied to the core 22, as indicated by step 104. For example, the core 22 may be dipped in the slurry. Following the dipping is an air knifing process to remove excess slurry. The highly adjustable viscosity of the washcoat slurry leads to a highly controllable coating thickness from five to over sixty microns.

The core 22, coated with the slurry, is then dried and cured in a short period of time from 2 to 10 minutes, as indicated at step 106. To dry the washcoat layer 26 in such a short period, the core 22 is rotated while the washcoat layer 26 is being shaped, dried and cured by a high flow air knife. The air knife is aligned in a radial direction with the air flowing longitudinally through the core 22 (i.e., in the same direction as that of the compressed air during operation of the catalytic converter 18). The core 22 is rotated at a rate between 1 and 5 rpm. During this step 106, the core 22 may be heated at about 80° C. to 250° C. for between ½ to 3 hours. This heat treatment both dries and cures the washcoat layer 26 and removes the organic solvent in the washcoat layer 26. During this process, the organosiloxane resin reacts and cross-links the metal oxide particles among themselves as well as with the oxide at the surface of the anodized layer 24. Resulting is a strongly bonded high surface area support that is formed via chemical cross-linking between the metal oxide of the anodized surface layer 24 and the organosiloxane resin and refractory metal oxide in the washcoat layer 26.

For the monolith core 22 having fin elements 23, the washcoat layer 26 generated from this process has very good thickness uniformity within each fin element 23 and throughout the core 22. The slurry just described dries faster than a slurry including a water-based binder. The faster drying allows the washcoat layer 26 to be applied more uniformly than a washcoat layer formed from a slurry including a water-based binder.

Once the washcoat layer 26 has been dried and cured, the core 22 undergoes calcination. Calcination, which is indicated at step 108, may be performed between two to ten hours at above 300° C. The preferred calcination temperature may range from 450° C. to 550° C. During calcination, the organic material in the washcoat layer 26 is burned off. Also, the chemical bonds cross-linked during the curing stage are transformed into a three-dimensional network of M1-[O—Si—O]$_n$-M2-O chemical bonds, where n≧1 and M1 and M2 could be the same or different metals in the metal oxides in the anodized and washcoat layers 24 and 26. The metal oxide in the anodized layer 24 is bridged with the metal oxide in the washcoat layer 26 through this network of bonds. Using the preferred mixture of boehmite and organosiloxane and toluene on an aluminum oxide anodized layer 24, the calcination also converts the boehmite to gamma phase alumina, and the organosiloxane in the washcoat layer 26 is transformed into silica or reacts with alumina to form alumina silicate. Therefore, the resulting washcoat over the anodized fin elements 23 consists mainly of gamma alumina, silica and alumina silicate.

During calcination, the washcoat layer 26 retains its high surface area. Consequently, the high surface area provides high exposure and interaction between the air and the catalyst.

After the washcoat calcination has been completed, the catalyst 28 is impregnated in the anodized and washcoat layers 24 and 26, as indicated at step 110. If the catalyst is bimetallic, the layers 24 and 26 may be catalyzed through a co-impregnation procedure, wherein the washcoated core 22 is dipped in a metal precursor solution. Preferably, the layers 24 and 26 are co-impregnated with a metal precursor solution of nitrate salts of palladium and nickel. In place of palladium, a salt solution of a metal from the precious metal group including platinum, rhodium, gold, iridium or silver may be chosen as the metallic precursor for impregnation. Likewise, in place of Ni, a metal from the transition group including manganese, cobalt, iron, or copper may be chosen. The precious and transition metals set forth above are typical of the metals that have been found to provide satisfactory results. However, other metals may be used. The chosen metals are preferably combined in a solution containing an organic acid that maintains a suitable acidity and acts as a dispersion reagent. Such organic acid may include citric acid, acetic acid or tartaric acid.

After the catalyst has been impregnated, a catalyst calcination is performed, as indicated at step 112, to convert the catalyst precursors into the active catalytic ingredients. The calcination temperature may range from 200° C. to 500° C. over 1 to 4 hours.

During catalyst impregnation, the dense portion of the anodized layer 24 prevents the catalyzing reagent from attacking the metal of the core 22. This allows the catalyst 28 to be impregnated after the washcoat layer 26 has been fully formed. Resulting is maximum catalyst utilization which leads to longer lifetime.

This invention is further described, although not limited, by the following examples.

EXAMPLE I

A set of aluminum fins with a volume of 0.385 ml and thickness of 7 mils was anodized in oxalic acid to form an aluminum oxide layer approximately 10 microns thick. The set of fins was further washcoated with a jarmilled mixture of diluted synthetic silicone resin with boehmite. The fins were dried, cured and calcined. The final weight of the fins increased by 20% due to formation of a layer of gamma alumina/silica over the fin surface. The surface area of the washcoated fins was about 40 to 70 m$^2$/g including the weight of the fins. This fins were subsequently catalyzed in a Pd and Ni nitrate solution containing citric acid through a co-impregnation process. This resulted in the final catalyst loading on the fins of 50 gPd/ft$^3$ and 300 gNi/ft$^3$. The fins were tested in a reactor from 75° F. to 400° F. with a 1,000,000 gas hourly space velocity (GHSV). Excellent ozone destruction activity was observed.

EXAMPLE II

An aluminum alloy monolith having an offset fin construction was anodized in oxalic acid to form an aluminum oxide layer approximately 10 microns thick. The monolith was washcoated with a jarmilled mixture of diluted synthetic silicone resin (with methylphenylpolysiloxane as the main ingredient), and boehmite. After drying, curing and calcination at approximately 538° C., the weight of the fins was increased by 20% due to formation of a coating of gamma alumina/silica over the fins. The monolith was subsequently catalyzed in a Pd and Ni nitrate solution containing citric acid by a co-impregnation process. This resulted in the final catalyst loading on the fin equal to 50 to 300 gPd/ft$^3$ and 100 to 500 gNi/ft$^3$. The monolith was then tested in dry air containing 1.0 ppm ozone at 2,000,000 GHSV. The pressure of test flow input was 25 psig and the temperature was 365° F. The ozone catalytic destruction efficiency was found to be 80% and above. The catalyzed core also demonstrated excellent resistance to known catalyst poisons, such as sulfur compounds and aviation lubricant.

EXAMPLE III

An alumina alloy monolith having an offset fin construction was prepared per EXAMPLE II. The monolith was tested in a stream of 1 ppm ozone in air at 250,000 GHSV and 45 psig. The following excellent efficiency was observed:

| T (° F.) | Efficiency (% of ozone removed) |
|---|---|
| 200 | 98.1 |
| 250 | 98.5 |
| 300 | 98.6 |
| 350 | 98.7 |

EXAMPLE IV

This example demonstrates the excellent low-temperature efficiency of ozone conversion. A set of fins was removed from the monolith following the test in EXAMPLE III and tested in a stream of 2.5 ppm ozone in air at 1,000,000 GHSV and 3 psig. The following efficiency was observed

| T (° F.) | Normalized Efficiency (% of ozone removed/% of ozone removed at 350° F.) |
|---|---|
| 122 | 74 |
| 212 | 84 |
| 302 | 92 |
| 350 | 100 |

EXAMPLE V

Several analytic techniques were employed to characterize the properties of the washcoat layer and the catalyst prepared per EXAMPLE I. The Brunauer-Emmett-Teller (BET) method was employed to determine the washcoat surface area and pore size distribution. It was determined that the washcoat layer had the preferred surface area ranging from 200 to 350 m$^2$/gram (excluding the weight of the fins). The preferred pore volume of the washcoat ranged from 0.2 to 0.9 cm$^3$/gram excluding the metal substrate. The average pore size ranged from 3 to 25 nm. A scanning electron microscopic (SEM) imaging method was used to study the morphologies of the anodized layer and the washcoat layer. The SEM revealed that the washcoat layer was highly porous while the anodized layer had a rough surface texture at the interface with the washcoat layer and was dense at the interface with the aluminum core. These are preferred morphologies for promoting catalytic decomposition of ozone during the operation and for providing strong bonding between the washcoat and anodized layers with the metal substrate during the catalytic operation as well as catalyst preparation. A high degree of metal and metal oxide dispersion over the washcoat and anodized layers was verified by X-ray diffraction (XRD) and CO adsorption isotherm methods. For example, the CO adsorption isotherm measurement indicated that the Pd in the catalyst had the dispersion index greater than 50%. Not bound to any catalytic theory, it is commonly believed that the oxidative state of the catalyst metal is important to the ozone destruction activity. To identify the oxidative state of the metal in the catalyst, an X-ray absorption near edge structure (XANES) method and an X-ray photoelectron spectroscopic (XPS) method were employed. It was determined that both metals had the preferred oxidation state for high catalytic activity. For example, XANES and XPS revealed that both Pd and Ni were in Pd$^{+2}$ and Ni$^{+2}$ oxidation states at the surface as well as through the depth of washcoat and anodized layers. Again not bound to any catalytic theory, it is commonly believed that the close interaction and the synergetic effect between the two catalyst metal ingredients are important to the ozone destruction activity and to extended lifetime. Extended X-ray absorption fine structure (EXAFS) spectroscopic method and the scanning transmission electron microscopy (STEM) method were used to investigate the short-range structure and the interaction between the metallic components. It was determined that the catalyst metals had a preferred short-range structure and close interaction. For example, EXAFS study indicated that Pd was coordinated with approximately four oxygen atoms and STEM demonstrated that Pd and Ni were in close proximity, evenly distributed within the metal oxide micro-crystallites throughout the catalyzed washcoat.

EXAMPLE VI

To demonstrate that the anodized aluminum layer provides improved binding strength for the washcoat layer and better corrosion resistance during the catalyzing, a pair of aluminum plates A and B having dimensions of 1"×2"×1/16" was prepared. The first plate A was cleaned with an industrial detergent followed by rinsing with deionized water. The second plate B was subjected to the anodization in the oxalic acid to form an anodized layer, as described in EXAMPLE I. Both plates were washcoated and subsequently catalyzed following the procedure described in EXAMPLE I. An American Society for Testing Materials (ASTM) test method for measuring adhesion (Designation D 3359) was used to evaluate the adhesion strength between the washcoat layer and the aluminum substrate for both plate A and plate B after the catalyzing process. It was found that the washcoat layer on the second plate B had much superior adhesion strength (classification was between 3B to 4B) than the washcoat layer on the first plate A (classification of less than 1B).

EXAMPLE VII

A thermal cycling test was conducted for an ozone destruction catalytic monolith prepared according to the procedure in EXAMPLE II to evaluate the mechanical durability of the washcoat layer and the catalyst under repeated thermal stress condition. The monolith was subjected to continuous airflow with inlet air pressure of approximately 100 psig and a flow rate of 100 lb/minute. The temperature of the air was varied between 150° F. to 500° F. with a temperature ramp rate of 75° F./minute. A total of 2000 thermal cycles was conducted during the test. The washcoat layer and catalyst weight loss was measured at the end of the test cycle. It was found that the washcoat layer and catalyst had excellent mechanical resistance to thermal stress and that the total weight loss was less than 2% after the test.

EXAMPLE VIII

A vibration test was conducted for an ozone destruction catalytic monolith prepared per EXAMPLE II to evaluate the mechanical durability of the washcoat layer and the catalyst under severe vibrations. The monolith was mounted on a vibration test stand and was subject to 15 hours of random vibrations in both longitudinal and transversal directions. Frequency was 10 Hz to 2000 Hz and 4.0 g rms in the longitudinal direction and 10 Hz to 2000 Hz at 9.54 g rms in the transveral direction. The mechanical integrity of the monolith was inspected, and the washcoat layer and catalyst weight loss were measured at the end of the vibration test. It was found that the monolith had no structural damage or variation. Furthermore, it was found that the washcoat layer and catalyst had excellent mechanical resistance to vibrational stress and that the total weight loss is less than 1% after the test.

The invention is not limited to the specific embodiments above. For example, the washcoat layer may be applied directly to an unanodized core. Such a core may be made of stainless steel or titanium that has been baked or otherwise oxidized at the surface. If the core is made of a material that already has a porous or oxidized surface, the washcoat layer may be applied directly to the surface of such a core.

The invention is not limited to the washcoat layer 26 described above. A washcoat layer including a metal oxide mixed with a water-based binder (e.g., alumina sol, silica sol) may be applied to the anodized surface layer 24. However, such washcoat layers may not display the superior characteristics of the washcoat layer 26 described above.

The catalyst 28 is not limited to any particular type and composition. For example, the catalyst 28 may be monometallic or bimetallic, or it may include more than two metals. Therefore, the catalyst may include at least two precious metals. It may also include at least one transition metal.

The core 22 is not limited to a single washcoating. Several washcoats may be performed to control uniformity of the washcoat layer 26.

Therefore, the invention is not limited to the specific embodiments above. Instead, the invention is construed according to the claims that follow.

What is claimed is:

1. An ozone-destroying catalytic converter for an environmental control system of an aircraft, the converter comprising:

a core, the core having an absence of an anodized layer;

a washcoat layer on the core;

an ozone-destroying catalyst impregnated in the washcoat layer; and wherein the washcoat layer comprises a metal oxide and an organosiloxane resin.

2. The ozone-destroying catalytic converter of claim 1 wherein the ozone-destroying catalyst is bimetallic.

3. The ozone-destroying catalytic converter of claim 1 wherein the ozone-destroying catalyst comprises at least one precious metal and at least one transition metal.

4. The ozone-destroying catalytic converter of claim 1 wherein the ozone-destroying catalyst comprises platinum and cobalt.

5. The ozone-destroying catalytic converter of claim 1 wherein the washcoat layer has a thickness of from about 5 microns to about 60 microns.

6. The ozone-destroying catalytic converter of claim 1 wherein the metal oxide is a refractory metal oxide chosen from alumina, silica, aluminum silicate, magnesia, manganese oxide, titania, zirconia, ceria, or boehmite.

7. The ozone-destroying catalytic converter of claim 1 wherein the organosiloxane resin is chosen from methylphenylsiloxane, methylsiloxane.

8. An ozone-destroying catalytic converter for an environmental control system of an aircraft, the converter comprising:

a core, the core having an absence of an anodized layer;
a washcoat layer on the core; and
an ozone-destroying catalyst impregnated in the washcoat layer, the ozone-destroying catalyst comprising at least one precious metal and at least one transition metal;
wherein the washcoat layer comprises a metal oxide and an organosiloxane resin;
wherein the metal oxide is a refractory metal oxide chosen from alumina, silica, aluminum silicate, magnesia, manganese oxide, titania, zirconia, ceria, or boehmite; and
wherein the organosiloxane resin is chosen from methylphenylsiloxane or methylsiloxane.

9. The ozone-destroying catalytic converter of claim 8 wherein the precious metal comprises platinum, palladium, rhodium, gold, iridium or silver and the transition metal comprises nickel, manganese, cobalt, iron or copper.

10. The ozone-destroying catalytic converter of claim 8 wherein the precious metal is platinum and the transition metal is cobalt.

11. The ozone-destroying catalytic converter of claim 8 wherein the washcoat layer has a surface area of from about 200 $m^2$/gram to about 350 $m^2$/gram.

12. The ozone-destroying catalytic converter of claim 8 wherein a pore volume of the washcoat layer is from about 0.2 $cm^3$/gram to about 0.9 $cm^3$/gram and the average pore size is from about 3 nm to about 25 nm.

13. The ozone-destroying catalytic converter of claim 8 wherein the core is a monolithic core including a plurality of offset fins providing a tortuous air flow path; the fins carrying the washcoat layer.

14. The ozone-destroying catalytic converter of claim 8 wherein the core comprises aluminum, an aluminum alloy, titanium, stainless steel, inconel, nickel alloy, silicon nitride, alpha aluminum oxide, cordierite, or other ceramic or composite materials.

15. An ozone-destroying catalytic converter for an environmental control system of an aircraft, the converter comprising:

a core, the core having an absence of an anodized layer;
a washcoat layer on the core, the washcoat comprising a partially hydrated refractory metal and an organosiloxane resin; and
an ozone-destroying catalyst impregnated in the washcoat layer, the ozone-destroying catalyst comprising platinum and cobalt.

16. The ozone-destroying catalytic converter of claim 15 wherein the washcoat layer has a thickness of from about 5 microns to about 60 microns and a surface area of from about 200 $m^2$/gram to about 350 $m^2$/gram.

17. The ozone-destroying catalytic converter of claim 15 wherein the washcoat layer comprises alumina, silica, aluminum silicate, magnesia, manganese oxide, titania, zirconia or ceria.

18. The ozone-destroying catalytic converter of claim 15 wherein the core is a monolithic core including a plurality of offset fins providing a tortuous air flow path, the fins carrying the washcoat layer.

19. The ozone-destroying catalytic converter of claim 15 wherein the core comprises a material having a porous or oxidized surface.

* * * * *

UNITED STATES PATENT AND TRADEMARK OFFICE
CERTIFICATE OF CORRECTION

| | |
|---|---|
| PATENT NO. | : 7,604,779 B2 |
| APPLICATION NO. | : 11/228949 |
| DATED | : October 20, 2009 |
| INVENTOR(S) | : Liu et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 984 days.

Signed and Sealed this

Fifth Day of October, 2010

David J. Kappos
*Director of the United States Patent and Trademark Office*